March 24, 1925.
R. L. ANTHONY
APPARATUS FOR DISPLAY
Filed Feb. 21, 1923
1,530,749
6 Sheets-Sheet 3
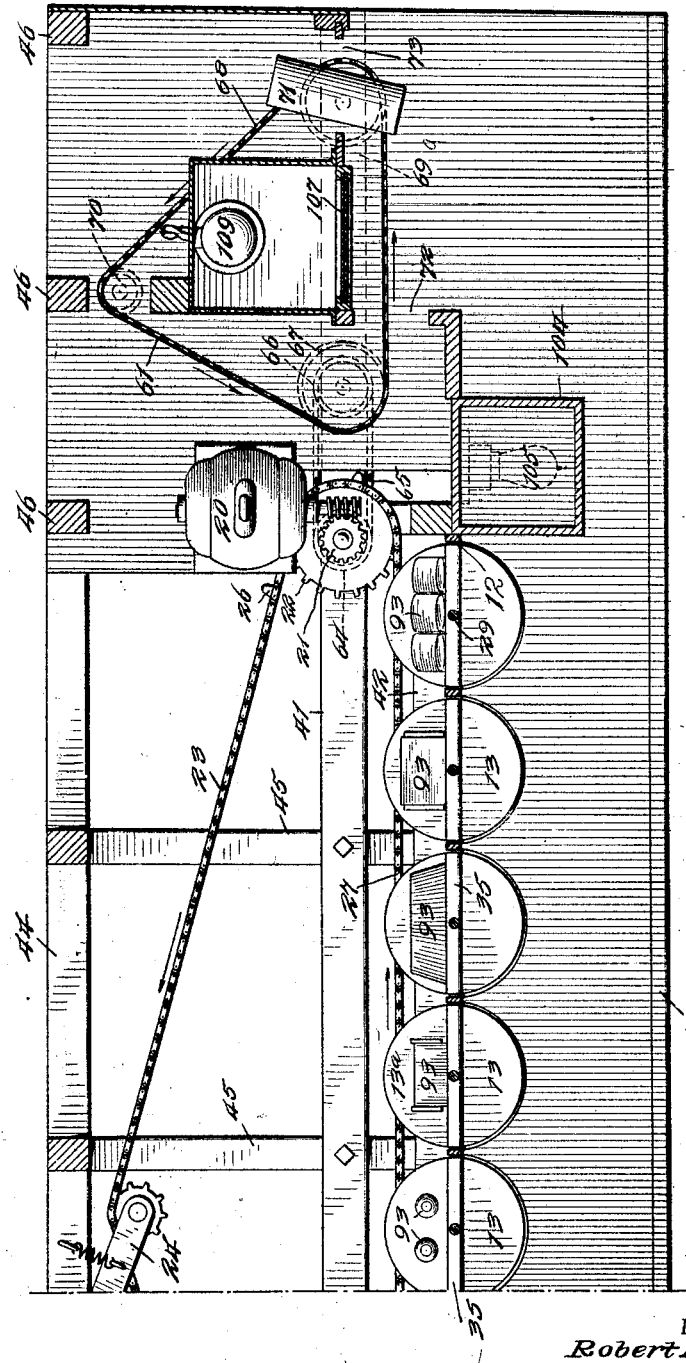
Fig. 2ᵇ
INVENTOR
Robert L. Anthony
BY
ATTORNEYS

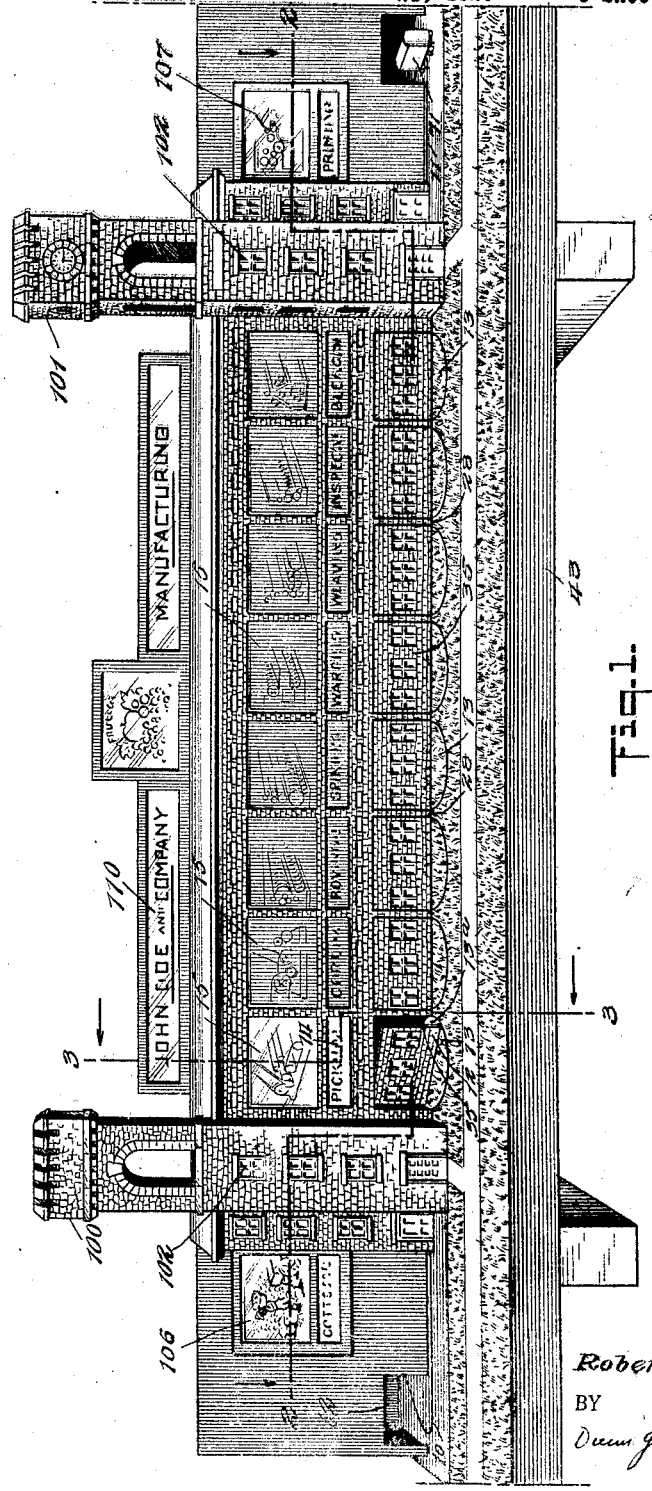

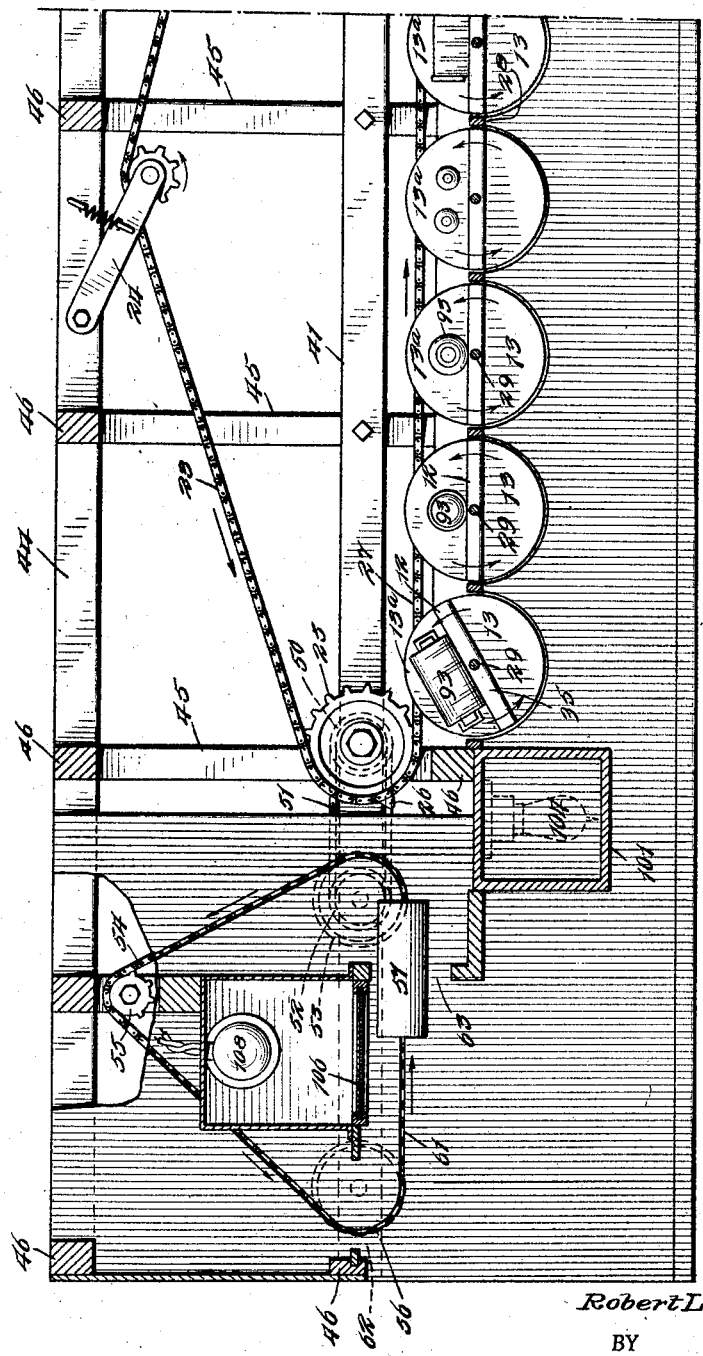

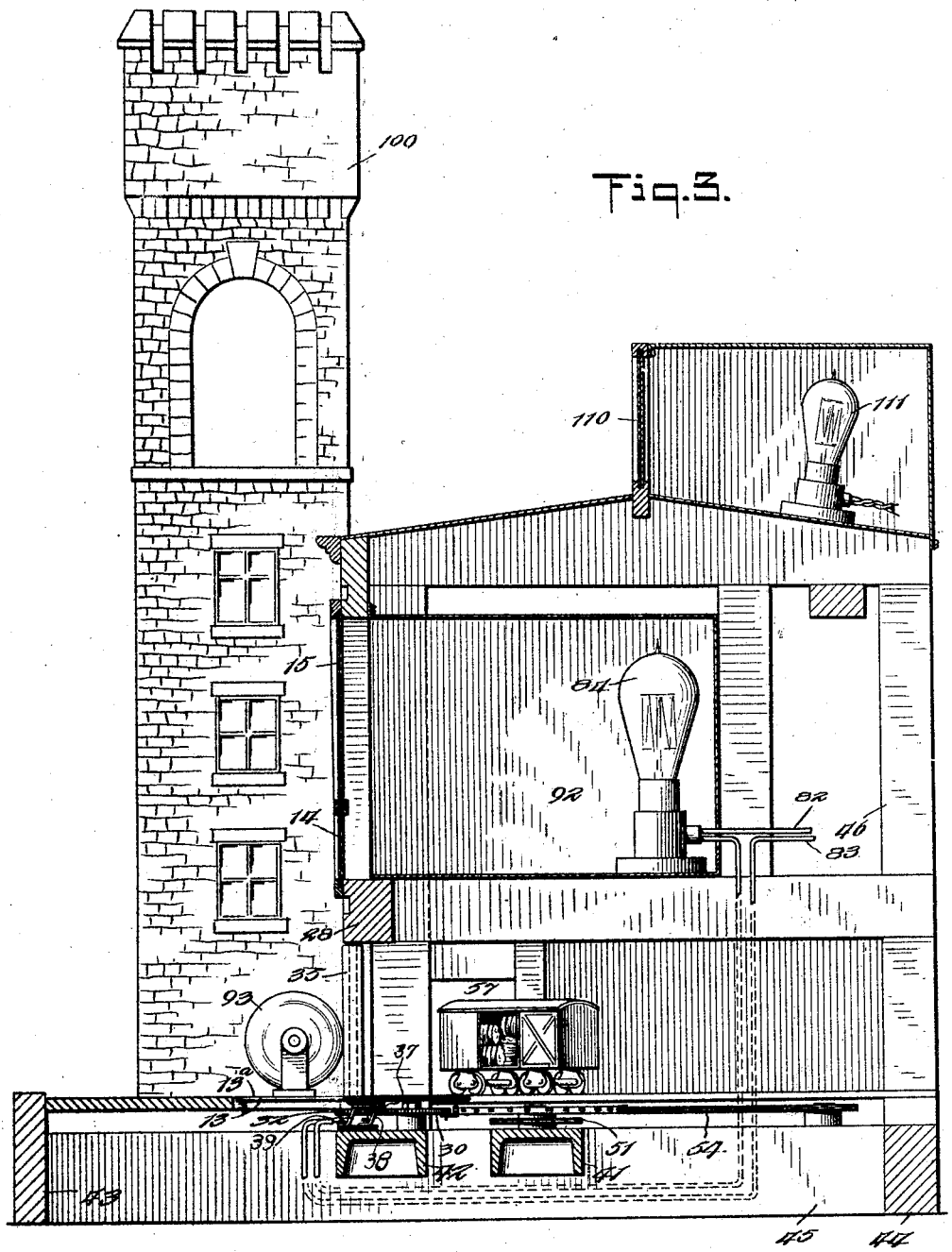

March 24, 1925.

R. L. ANTHONY 1,530,749

APPARATUS FOR DISPLAY

Filed Feb. 21, 1923

INVENTOR
Robert L. Anthony
BY
ATTORNEYS

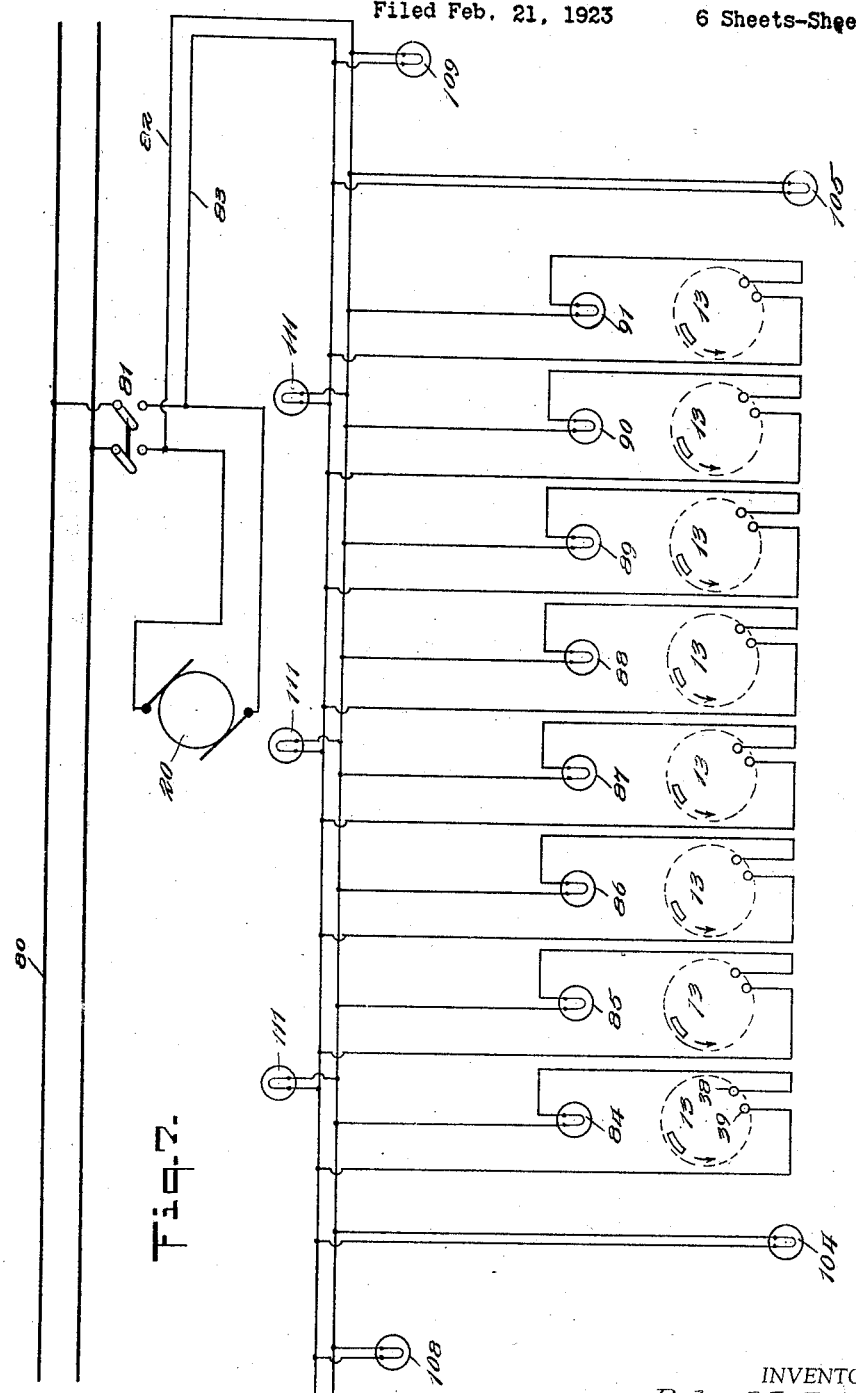

Patented Mar. 24, 1925.

1,530,749

UNITED STATES PATENT OFFICE.

ROBERT L. ANTHONY, OF PROVIDENCE, RHODE ISLAND, ASSIGNOR TO B. B. & R. KNIGHT, INC., A CORPORATION OF MASSACHUSETTS.

APPARATUS FOR DISPLAY.

Application filed February 21, 1923. Serial No. 620,352.

*To all whom it may concern:*

Be it known that ROBERT L. ANTHONY, a citizen of the United States, residing at Providence, in the city and county of Providence and State of Rhode Island, has invented new and useful Improvements in Apparatus for Display, of which the following is a specification.

This invention relates to an apparatus for display, and more particularly to an apparatus adapted for educational and advertising purposes.

It is particularly useful in that it provides a convenient way to instruct or convey information with respect to the steps carried out in a manufacturing process, or in the operation of a complicated machine. It is well known that an individual is likely to be more interested in purchasing an article when he is familiar with its mode of operation or the process of manufacture whereby it acquires its superior and distinctive qualities. The general public is frequently unfamiliar with manufacturing processes and the operation of machines, not so much on account of disinterestedness, as on account of the effort necessary in obtaining this information and inability to obtain access to the factories for observation of processes.

It is an object of my invention to provide an apparatus for instructing the general public and arousing their interest in a manufacturing process or machine and I do this by providing an apparatus for displaying the particular process or machine in a complete, satisfactory and novel manner, and so that, in a few moments of observation, a large number of people may obtain a substantially complete birds-eye view of the process or machine. My invention is suitable for use in educating and instructing one relative to many kinds of manufacturing processes, the operation of machines, the demonstration of the development of diseases, etc.

In this application I have disclosed a unitary apparatus for disseminating information relative to the manufacture of cotton cloth. It has been found very useful as an advertising device for installation in show windows, at exhibitions, etc.

Another object of the invention is to provide an apparatus for display which delineates the carrying out of a manufacturing process from raw material to finished product and which displays the product at various stages of manufacture with an appropriate legend descriptive of the product, and preferably with an illustration of the machinery used at a corresponding stage of manufacture.

Another object of the invention is to provide a display apparatus in which the carrying out of a manufacturing process or the operations of a machine may be demonstrated to an observer, the observer being shown a physical embodiment of the medium at each stage or step, together with an illustration appropriate to the medium displayed.

Another object of the invention is to provide a display device which may be operated by suitable power, such as an electric motor, to successively bring into view samples showing the condition of the product at the various stages of manufacture, and to simultaneously control the observability of a suitable image, such as a picture or transparency.

Another object of the invention is to associate with a continuously moving motor driven mechanism a series of display elements each carrying some article to be displayed, together with suitable contacts for controlling the electric circuit of a lamp for illuminating a picture appropriate to the article displayed, and preferably to arrange the display elements so that one is brought into view and a corresponding lamp lighted at about the same time as the preceding one is taken out of view and the corresponding lamp extinguished.

Another object of the invention is to provide a unitary display device by which the manufacturer can show his factory and his manufacturing process, the latter both by a physical exhibit and an appropriate illustration, in order that the entire exhibit may be easily moved from one store window to another and from one town to another without dismantling.

For purposes of illustrating the invention, I have shown the carrying out of the display in connection with the manufacture of cotton cloth, which may be considered as starting with the bales of cotton. These bales weigh approximately five hundred pounds, and are made up of cotton bolls from which the seeds and some of the foreign matter have been removed by the cotton gin. The fibres in the bale of cotton are in no particular order. Instead, they are extremely tangled. The manufacturing of cotton cloth may be, to a large extent, considered the process of straightening out these fibres and spinning them into threads, then weaving the threads into cloth. It is the story of such a process that this embodiment is to show to the observer.

The first step after removal of the burlap from the bales of cotton is that of cleaning the fibre. The cotton fibre is fed into openers where it is milled around until the matted masses are loosened and the cotton is in shape to be conveyed to the machines called breaker pickers. In these pickers, arms striking the stream of incoming fibres very rapidly pound out bits of dirt, leaves, sand, motes, and foreign particles. The cotton is then in large sheets similar to cotton batting and is wound on cylinders to produce a lap. Two or more of these laps are then brought together and run through a doubling machine which mixes together the cotton fibre from a plurality of bales of cotton.

These laps, which resemble huge rolls of absorbent cotton, are taken from the picker to the carding room. In the cards are drums operating at different speeds. These drums have steel teeth which comb the cotton, and the cotton comes from the cards in a fleecy sheet, as light as a cobweb. It is then drawn through a funnel into an untwisted rope, or sliver. These slivers are then doubled and passed between rollers which stretch them out to several times their original length whereupon they are passed to a slubber which winds the fragile cotton yarn for the first time upon a spindle and gives it an initial twist. More doubling, more stretching, more twisting, and more winding are given to the cotton in what are called roving machines which prepare the fibre for the spinning operation whereupon it receives a final twist to make it into yarn.

The yarn which is intended for the filling goes direct from the spinning machines, while that which is intended for the warp is prepared to stand a heavier strain in the weaving process. It is spooled, then the threads are taken from the spools and rewound in parallel form on a warp beam. The warp yarn is then slashed by being bathed in sizing and dried, in order to remove the fine fuzz present on the yarn when it was spun and produce a hard surface.

The next operation is weaving and this is carried out in the loom in which the warp yarns are alternately raised and lowered by a harness. The shuttle carries a strand of filling yarn first under and then over a thread of warp yarn, thus weaving in the strand. The strand is then pushed into the cloth. The warp is unwound from the loom beam automatically at the proper speed just as the cloth is taken up and wound automatically into large rolls after it has been manufactured. The cloth from the loom then passes through a brushing machine, is inspected to detect flaws and insure a uniform quality and is then folded or rolled.

The cloth is then known as "gray goods" and is in condition for converting or finishing. The unbleached cloth is yellowish gray in appearance and contains impurities which were not removed during the spinning and weaving. It has also picked up additional impurities in the mill, and fuzzy ends of fibres are sticking to the surface. These are removed by singeing and shearing.

For certain purposes it is desirable to have white cloth and it is then necessary to bleach the goods. This is carried out by chemical means and the white cloth is delivered from the bleaching process. For many purposes, however, it is desirable that the bleached cloth be printed or dyed, in order that attractive and permanent colors and designs be available. Either of these operations is carried out in suitable machinery. The bleached cloth or the printed or dyed cloth is then prepared for the market by being finished, which includes starching, tentering, calendering, mercerizing, etc. The finishing gives the cloth the desired feel, the required uniformity and the particular degree of smoothness essential.

The drawings show a layout of an embodiment of this invention suitable for displaying the process which has just been described. In these drawings:

Fig. 1 is a front view of a display device made up for the purpose of showing the manufacture of cotton cloth;

Fig. 2 is a plan view in two parts—namely, Fig. 2ª and Fig. 2ᵇ and taken on the line 2—2 of Fig. 1;

Fig. 3 is a section taken on the line 3—3 of Fig. 1;

Fig. 7 is a diagram of the electrical connections.

Figure 4:
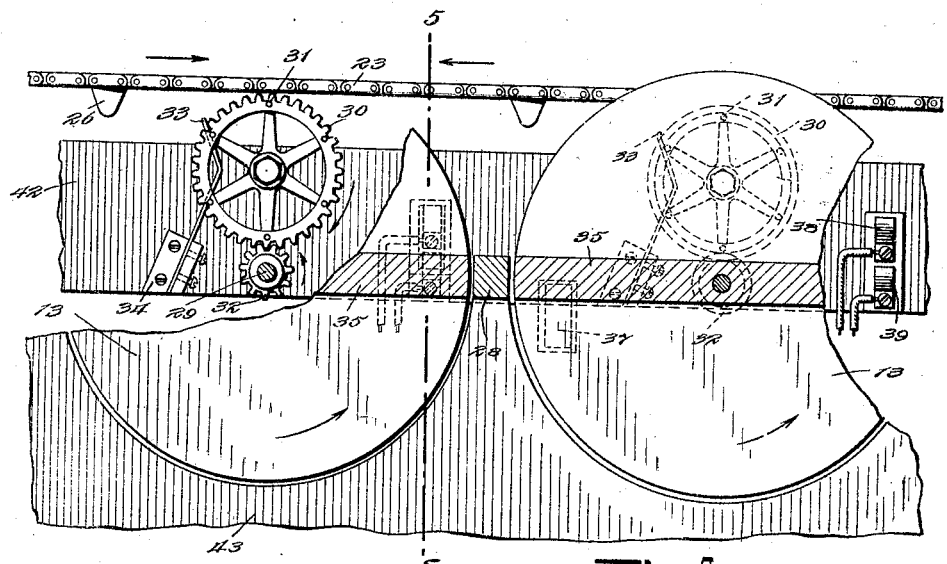
Fig. 4 is a plan view of the mechanism for operating the scene shifting mechanism of the display.

In order to carry out the illusion that the observer is looking at a cotton mill, the illustrated device may be designed to resemble in appearance such a mill, a front view of which is shown in Fig. 1. A railroad siding 10 is shown at the left, this siding being adapted to carry a car to illustrate the bringing in of the baled cotton. At the right is shown another railroad track 11 which illustrates the shipping platform from which the finished goods are sent away from the mill.

In this embodiment of the invention, the representation of the wall of the mill is divided into a number of sections. These sections are utilized to carry out the displaying of the process. A convenient way of doing this is to divide the lower portion of the wall into a number of sections 12, which are carried on rotatable platforms or scene-shifters 13. A legend, which may be either in the form of a transparency or merely a printed sign, is placed above the sections 12. This legend is preferably a short description of the stage of the process which it is desired to illustrate in the corresponding section of the wall. Above the legend 14 there may be placed a comparatively large transparency 15 which when illuminated will illustrate the machines used at this stage. The exhibit is provided with a sufficient number of sections, legends, and transparencies to properly display the process for which the device is designed.

In the device illustrated in Fig. 1 eight of these sections are shown and when arranged for displaying the manufacturing of cotton cloth they may be conveniently arranged to show, first, the picking operation in which the cotton is opened, cleaned and put into lap form; second, the carding operation in which the fibres are cleaned and brought parallel; third, the roving in which the ends are brought down and twisted; fourth, the spinning in which yarn is produced; fifth, the warping in which the yarn is brought in position for weaving; sixth, the weaving in which the filling and warp are combined; seventh, the inspecting; and eighth, the bleaching to make the cloth white.

I will now describe the details of a mechanism which I have found suitable for carrying out the display contemplated. Fig. 2 which is a section taken on the line 2—2 of Fig. 1, shows the general layout of this mechanism.

An electric motor 20 is provided with suitable reduction gearing 21 to drive a sprocket wheel 22 which may be conveniently located adjacent one of the sections 12. This sprocket wheel in turn drives a chain 23 in the direction indicated by the arrow, the chain passing about a spring-controlled tightener 24 and about a sprocket wheel 25 preferably located adjacent the other end section 12. The chain 23 is provided with a plurality of lugs 26, two of which are shown in the drawings. The portion 27 of the chain, which lies between the sprocket wheels 22 and 25, is carried directly back of the front wall 28 of the mill and may conveniently be located underneath the floor level. The sections 12 of the walls 28 are carried on turntables or scene-shifters 13 mounted to turn on vertical axes 29.

Figure 5:
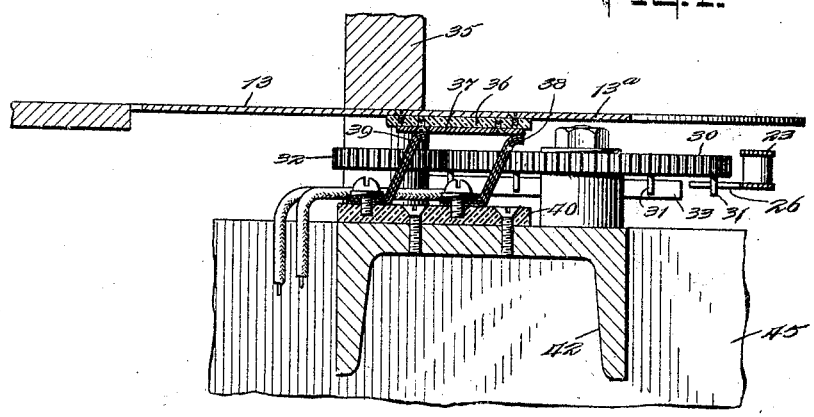
Fig. 5 is a section taken on the line 5—5 of Fig. 4, illustrating the electrical control of a transparency by the scene shifter.

These turntables 13 are associated with driving mechanism, illustrated more in detail in Figs. 4 and 5, whereby they may be driven from the sprocket chain 23 by means of the spaced apart lugs 26 attached to the chain. The lugs 26 are carried underneath a gear 30 and engage with one of a number of spaced apart pins 31, which are shown more clearly in Fig. 5. The movement of the lugs will turn the gear 30 part way around on its axis and this in turn will rotate a smaller gear 32, carried by the spindle 29, a half revolution; thereby turning the turntable half-way around each time one of the lugs 26 engages the pin 31. In order that the turntable may be stopped in the desired position, without overrunning or turning backwards, there is provided a yielding leaf spring 33 mounted on a support 34, so that the spring is adapted to engage two of the pins 31.

These turntables 13 may be conveniently made up of a thin disc of sheet metal, carrying an upright element 35 on one side of which one may conveniently place the representation of the lower portion of the walls of the mill which the display is to represent. In Fig. 1 this upright 35 is shown as having windows and bricks outlined thereon. The opposite or inside wall of the upright 35, together with the back portion 13ª of the turntable disc are utilized as a support to carry a suitable physical embodiment of the product or medium for which the device is being used.

In order to properly illuminate the legend 14 and transparency 15 appropriate for the particular display being carried on one of the scene-shifter devices, the lower surface of the disc 13 is provided with a strip of insulation 36 on which is supported a contact plate 37 adapted to engage at the proper time a pair of the spaced apart contacts 38 and 39 in a lighting circuit. These contacts are supported on a block of insulation 40, carried on a part of the framing to be described.

The entire device is carried on a rigid framework which includes a suitable arrangement of members to support the parts. In the present embodiment of the invention this framing includes two strong steel channel members 41 and 42 (shown more clearly in Fig. 3) and a wooden framework for the building. This framework may include a front sill 43, a rear sill 44, suitable cross members 45 connecting the sills 43 and 44 and fastened to the channels 41 and 42. The frame is also provided with suitable uprights, designated 46, adapted to support the upper part of the exhibit. The arrangement of these uprights will vary according to the type of mill, which it is desired to show. The sprocket gears 22 and 25 and the members 26 are preferably supported direct from the channel member 41, while the turntables 13, driving gears 30 and contact insulating strips 40 are carried by the other channel member 42. This arrangement of framework affords a light-weight structure which is sufficiently rigid for the purpose and which can be easily transported.

Figure 6:
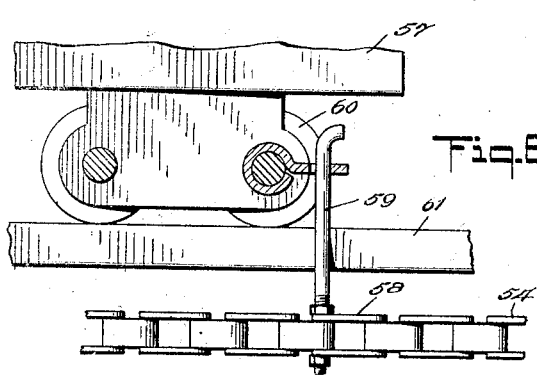
Fig. 6 is a view illustrating the connection of the miniature railway car with a driving chain.

At the left in Fig. 2ª, an additional sprocket gear 50 is shown as being mounted on the shaft of the sprocket wheel 25. The gear 50 is adapted to drive through a sprocket chain 51 and a sprocket wheel 52, connected with a larger sprocket wheel 53, a chain 54. This chain 54 passes about a small idler 55 carried in the back part of the exhibit and about a third gear 56. The gears 52, 53, and 56 are preferably mounted in the end portion of the channel member. This chain carries a miniature car 57 in such a position that it apparently travels on the track 10. The drive of this car is illustrated in Fig. 6. One of the links 58 of the chain 54 is provided with an upright finger 59, which is attached to the running gear 60 of the car. The finger passes through a slot 61 and, in the operation of the device, brings the car out of the opening 62 in the front of the exhibit and carries it in through the opening 63 to make it appear as if the carload of baled cotton were being brought into the mill.

A sprocket gear 65 is carried underneath the sprocket gear 62 and this drives through a sprocket 65 and gears 66 and 67, a sprocket chain 68 passing about gears 69 and 70. The chain 68 carries a car 71 in a manner similar to the way the car 57 is carried by the chain 55, and this car is, at the proper time, brought out by the chain 68 through an opening 72 in the wall of the representation of the mill, the car is then carried along in front of the observer and through an opening 73 to illustrate the shipping of the finished goods and, if desired, their receipt by the customer. The gears 66, 67, and 69 are carried on the right hand end portion of the channel member 41.

The circuit diagram for the device herein illustrated is shown in Fig. 7. The power is taken from the mains 80 through a control switch 81 to operate the motor 20 and thence to the lighting circuit of the display device. This lighting circuit has one wire 82 which is connected directly to the lamps. The other wire 83 is connected directly to such of the lamps as are intended for general or continuous illumination, and is connected to the contacts 39 carried underneath the tables 13. The contacts 38 are connected to the other side of lamps 84, 85, 86, 87, 88, 89, 90 and 91.

Each of these lamps are in compartments. Fig. 3 shows lamp 84 in a compartment 92 inside the representation of the cotton mill and above the first turntable. In this figure the turntable is shown as being turned to display an article 93, and the contact 37 moved around into the position to connect with the contacts 38 and 39. The transparency 15 and the legend 14 are at the front of the compartment 92, hence, it is apparent that whenever the turntable is turned to the position of Fig. 3, to show the article carried thereby, then the lamp 84 is lighted, thereby illuminating the transparency so that the observer may read the legend and may observe the brightly lighted view having an appropriate illustration.

In the embodiment herein illustrated, the factory is shown as having two towers 100 and 101 provided with windows 102. In order to render the exhibit more attractive these towers have been illuminated by means of lamps 104 and 105 connected directly across the lighting means 82 and 83. The exhibit is also provided with transparencies 106 and 107 arranged to be illuminated by lamps 108 and 109. One of these transparencies is placed at either end of the exhibit and they carry an appropriate picture. Here the left picture shows the field of cotton, while the one at the right might show the printing operation which is carried out on the finished goods, or an interior of a department store.

The subject matter of the exhibit may be described in a general way by a sign such as is shown at 110 illuminated by lamps 111. This sign is preferably so arranged that it can be read at much greater distance than is possible with the smaller legends.

The cycle of operations carried out by the present embodiment of the device is as follows: The car 57 is first seen coming out through the opening 62 at the left end of the display apparatus. The car then passes to the right along the track or siding 10 and enters into the mill, as shown at the left hand end of Fig. 2ª. The car carries a suitable legend and may, to further carry out the illusion, be in the form of a box car with an open door and filled with little bales of cotton. Just as the car 57 enters the mill, the mechanism is preferably so timed that a lug 26 in a chain 23 engages one of the pins 31 so that the gear 30 underneath the left hand turntable 13 is moved. As the chain moves along the gears 30 and 32 are rotated to sufficient extent to turn the turntable from the position wherein the object was concealed, to a position to show the object. The leaf spring 33 cooperating with the pins 31 serves to insure that the turntable is stopped at exactly the right place. In this position the contact 37 bridges the contacts 38 and 39, thereby illuminating the lamp 84. This lamp, in turn, brightly lights the transparency and the observers can, in the embodiment under consideration, now see a small roll of cotton which is passed through the picking machines. They also see a detailed illustration of these machines and read the small appropriate legend. Where the device is used for show window demonstration, it may be made of such size that very accurate illustrations of the machines may be shown in the transparencies, or if desired the illustration may be in the form of a moving picture, or a photograph. The observers obtain a close-up view of this picked cotton and can see how it differs from the baled cotton. After the observers have been given sufficient time to observe this picked cotton and the pickers and read the legend, another lug in the chain 23 comes into position to engage another one of the pins 31 and start turning the scene-shifter to position to conceal the picked cotton. At the same time that the first turntable is being turned to the concealing position, the second turntable is being turned to the displaying position so as to show a sample of the carded cotton, and, when the movement of this turntable has been completed, the lamp 85 is lighted and now the observer sees, in addition to the carded cotton, a legend describing what is being shown and illustrations of an appropriate machine used for carding cotton. The succeeding turntables and transparencies are brought to the observer's attention one after the other until the cotton cloth is shown as having been bleached. The mechanism for driving the car 71 is now moved around to a position so as to bring this car out of the opening 72 and carry it around inside the opening 73.

It has been found that the device has been very satisfactory for making demonstrations in show windows. It can then be made of comparatively large size and be observed by a large number of persons standing outside the window. The device operates entirely automatically and no human agency is apparent to the observer. His attention is concentrated upon the display being put out by the device. Furthermore, the device operates under ideal lighting conditions, as it is adapted to operate in daylight or at night in an illuminated store window.

What is claimed is:

1. A display comprising a representation of a factory, and means for successively displaying alongside the representation the product at a given stage of manufacture while concealing the products of other stages of manufacture.

2. A display comprising a representation of a factory, means for successively displaying alongside the representation the product at a given stage of manufacture, and means for simultaneously displaying a legend descriptive of the stage of manufacture, the product of which is being displayed while concealing the products of other stages of manufacture.

3. A display comprising a representation of a factory, means for successively displaying alongside the representation the product at a given stage of manufacture, means for simultaneously displaying a legend descriptive of the stage of manufacture, the product of which is being displayed, and means for simultaneously illustrating alongside each product-display the operation of the factory during that stage of manufacture while concealing the products of other stages of manufacture.

4. A display comprising a representation of a factory, means for displaying the raw material delivered to the factory, means for successively displaying alongside the representation the product at a given stage of manufacture, and means for simultaneously displaying a legend descriptive of the stage of manufacture the product of which is being displayed while concealing the products of other stages of manufacture.

5. A display comprising a representation of a factory, means for displaying the raw material delivered to the factory, means for successively displaying alongside the representation the product at a given stage of manufacture, and means for simultaneously illustrating alongside each product-display the operation of the factory during that stage of manufacture while concealing the products of other stages of manufacture.

6. A display comprising a representation of a factory, means for displaying the raw material delivered to the factory, means for successively displaying alongside the representation the product at a given stage of manufacture, means for simultaneously displaying a legend descriptive of the stage of manufacture, the product of which is being displayed, and means for simultaneously illustrating alongside each product-display the operation of the factory during that stage of manufacture while concealing the products of other stages of manufacture.

7. A display comprising a representation of a factory, means for displaying the raw material delivered to the factory, means for successively displaying alongside the representation the product at a given stage of manufacture, means for simultaneously displaying a legend descriptive of the stage of manufacture, the product of which is being displayed while concealing the products of other stages of manufacture, and means for thereafter displaying the finished product.

8. A display comprising a representation of a factory, means for displaying the raw material delivered to the factory, means for successively displaying alongside the representation the product at a given stage of manufacture, means for simultaneously illustrating alongside each product-display the operation of the factory during that stage of manufacture while concealing the products of other stages of manufacture, and means for thereafter displaying the finished product.

9. A display comprising a representation of a factory, means for displaying the raw material delivered to the factory, means for successively displaying alongside the representation the product at a given stage of manufacture, means for simultaneously displaying a legend descriptive of the stage of manufacture, the product of which is being displayed, means for simultaneously illustrating alongside each product-display the operation of the factory during that stage of manufacture, while concealing the products of other stages of manufacture, and means for thereafter displaying the finished product.

10. A display comprising a representation of an apparatus in which a medium is subjected to a series of steps to obtain a result, and means for successively displaying alongside the representation the medium at a given step while concealing the medium at other steps of manufacture.

11. A display comprising a representation of an apparatus in which a medium is subjected to a series of steps to obtain a result, means for successively displaying alongside the representation the medium at a given step, and means for simultaneously displaying a legend descriptive of the step being displayed while concealing the medium at other steps of manufacture.

12. A display comprising a representation of an apparatus in which a medium is subjected to a series of steps to obtain a result, means for successively displaying alongside the representation the medium at a given step, and means for simultaneously illustrating alongside each product-display the operation of the apparatus on the medium while concealing the medium at other steps of manufacture.

13. A display comprising a representation of an apparatus in which a medium is subjected to a series of steps to obtain a result, means for successively displaying alongside the representation the medium at a given step, means for simultaneously displaying a legend descriptive of the step being displayed, and means for simultaneously illustrating alongside each product-display the operation of the apparatus on the medium while concealing the medium at other steps of manufacture.

14. In combination, a plurality of scene-shifters each having two positions, in one of which it is adapted to display a physical exhibit and in another to conceal it, means for operating the scene-shifters to successively display their respective exhibits, while the other exhibits are concealed, a plurality of illustrative exhibits each appropriate to one of the physical exhibits displayed, and means for illuminating the appropriate illustrative exhibit simultaneously with the display of the physical exhibit.

15. In a display apparatus, a motor, a plurality of scene-shifters mounted alongside one another and having a concealing position and a displaying position, a gear train for driving each scene-shifter, a chain driven by the motor, spaced apart lugs on the chain, and means associated with each gear train and engageable by the lug for intermittently driving the gear train a sufficient amount to move the scene-shifter from one position to the other, the connections for the successive gear trains being so timed that the scene-shifters are moved to alternately display and conceal, the concealing of one scene-shifter being followed by the displaying of an adjacent scene-shifter.

16. A display device comprising the representation of a factory, said representation including a plurality of swinging portions mounted upon rotatable members forming platforms, an exhibit of a given stage of manufacture mounted on each of the rotatable platforms, on one side of the swinging portion, the exhibits being normally concealed from view behind the swinging portions and means for successively rotating the platforms to bring the exhibits into view.

17. A display device comprising the representation of a factory, said representation including a plurality of swinging portions mounted upon rotatable members forming platforms, an exhibit of a given stage of manufacture mounted on each of the rotatable platforms, on one side of the swinging portions, the exhibits being normally concealed from view behind the swinging portions, and means for successively rotating the platforms to successively bring the exhibits into view and then to conceal them, only one exhibit being in view at a time.

18. A display device comprising the representation of a factory, said representation including a plurality of swinging portions mounted upon rotatable members forming platforms, and a compartment over each swinging portion having a transparent front illustrating a given operation of the factory, an exhibit of said operation of the factory mounted on each of the platforms beneath each of the compartments, on one side of the swinging portions, the exhibits being normally concealed from view behind the swinging portions, means within each of the compartments for illuminating the same, and means for successively rotating the platforms to bring the exhibits in view and simultaneously illuminate the compartment above the exhibit which is in view.

ROBERT L. ANTHONY.